Figure 1:
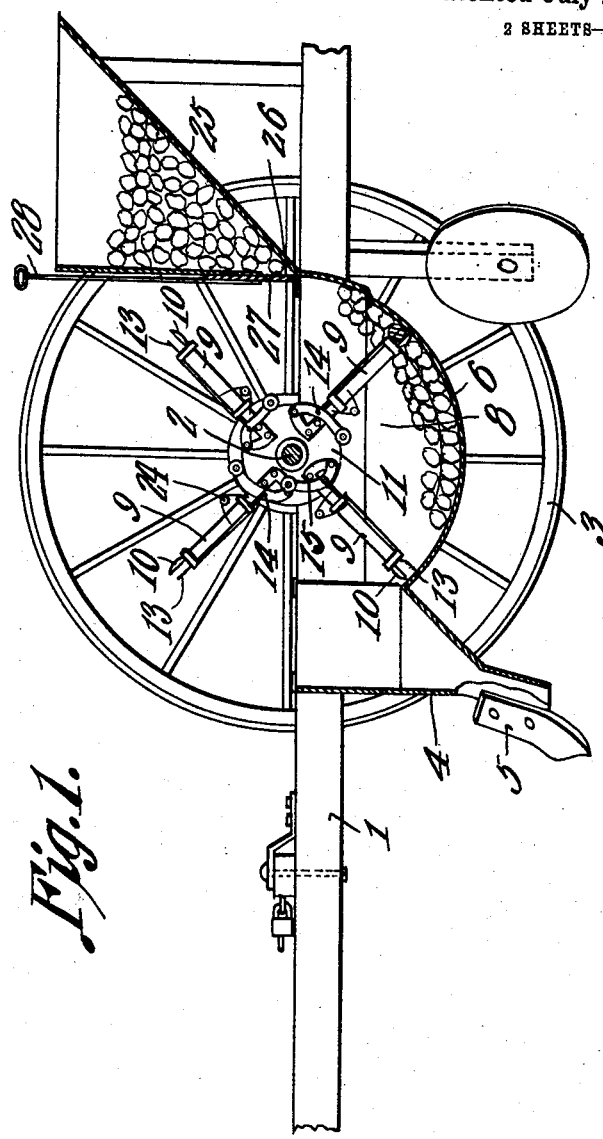

J. THOMPSON.
DROPPING MECHANISM FOR POTATO PLANTERS.
APPLICATION FILED APR. 6, 1911.

1,033,213.

Patented July 23, 1912.
2 SHEETS—SHEET 1.

Witnesses

James Thompson,
Inventor
by C. A. Snow & Co.
Attorneys

J. THOMPSON.
DROPPING MECHANISM FOR POTATO PLANTERS.
APPLICATION FILED APR. 6, 1911.
1,033,213.
Patented July 23, 1912.
2 SHEETS—SHEET 2.
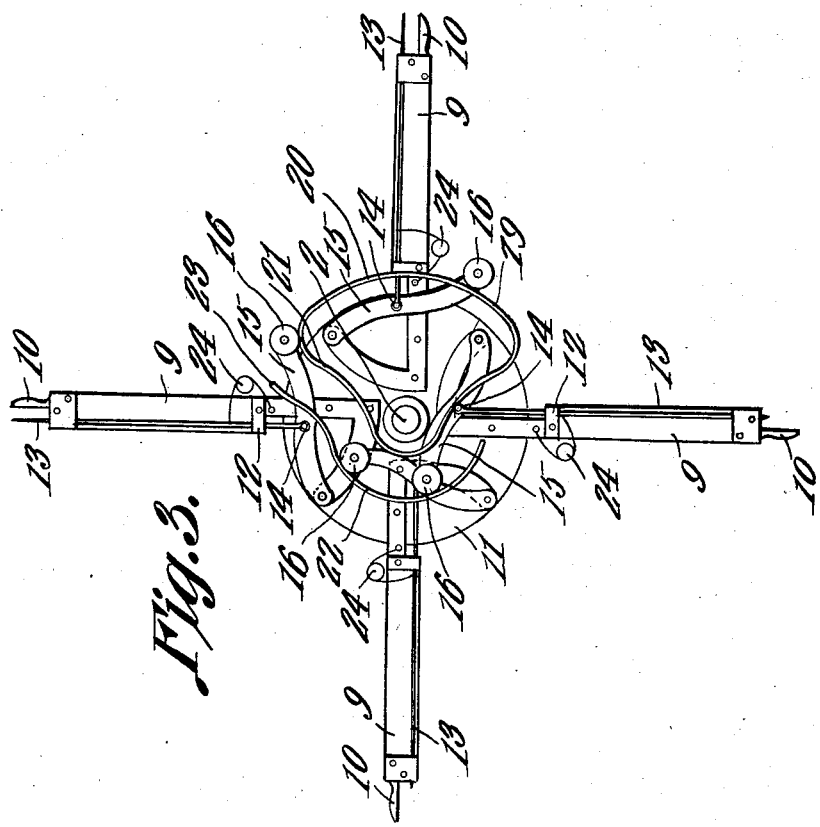
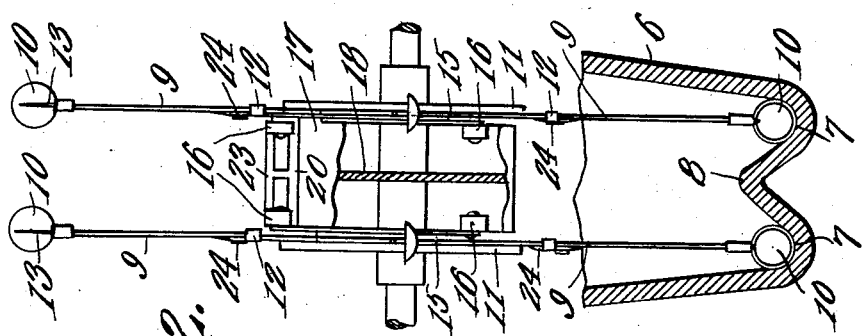
Witnesses
James Thompson,
Inventor
by
Attorneys

UNITED STATES PATENT OFFICE.

JAMES THOMPSON, OF GREELEY, COLORADO.

DROPPING MECHANISM FOR POTATO-PLANTERS.

1,033,213.  Specification of Letters Patent.  Patented July 23, 1912.

Application filed April 6, 1911. Serial No. 619,319.

*To all whom it may concern:*

Be it known that I, JAMES THOMPSON, a citizen of the United States, residing at Greeley, in the county of Weld and State of Colorado, have invented a new and useful Dropping Mechanism for Potato-Planters, of which the following is a specification.

This invention relates to dropping mechanism for potato planters, the object of the invention being to provide means whereby the seed potatoes will be automatically engaged one at a time and conveyed to a point above a shoe carried by the planter where the said potatoes are automatically released so as to drop into the shoe, the potato conveying mechanism including means for stabbing the potatoes and thus holding them during their movement to position above the shoe, the stabbing devices being automatically withdrawn at the proper time so as to free the potatoes.

A further object is to provide dropping mechanism of the class described which is easy to operate and which will drop the potatoes at regular intervals.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

In said drawings:—Figure 1 is a central vertical longitudinal section through a potato planter having the present improvements embodied therein. Fig. 2 is a view partly in elevation and partly in section of the dropping mechanism, a portion of the hopper being shown in section. Fig. 3 is an enlarged side elevation of the dropping mechanism.

Referring to the figures by characters of reference 1 designates a frame of any preferred construction and on which a shaft 2 is journaled, this shaft being actuated by the supporting wheels 3 or by any suitable mechanism operated by the wheels. A shoe 4 is suspended from the frame in front of the shaft 2 and may be of the usual or any preferred type and follow a furrow opener such as indicated generally at 5.

A concave 6 is suspended from the frame and under the shaft 2, the bottom of this concave being preferably concentric with the shaft and the walls of said concave diverging upwardly, as indicated in Fig. 2. The bottom of the concave is formed with parallel channels 7 spaced apart by an upstanding rib 8 and the bottom of each of these channels is preferably semi-circular in transverse contour.

Arranged above each of the channels 7 is a series of arms 9 terminating at their free ends in spoon-like buckets 10 while their inner ends are secured to a disk 11 mounted for rotation with the shaft 2. Guide ears 12 project forwardly from the advancing edges of the arms 9 and slidably mounted within the ears on each arm is a stabbing needle 13 parallel with the arm and the inner end of which is pivotally connected, as at 14, to a lever 15. Said lever is fulcrumed upon the disk 11 and carries an anti-friction roller 16. One of these levers and needles is provided for each arm 9 and when the levers 15 are swung inwardly to their greatest extent toward the shaft 2, the points of the needles 13 are retracted out of the path of the buckets 10.

Interposed between the disks 11 and held against rotation in any preferred manner, is a cam indicated generally at 17, said cam including a central web 18 on each side of which are arranged the bearing members of the cam. One of these bearing members, which has been illustrated at 19, has an arcuate portion 20 projecting beyond and concentric with the disk 11, this arcuate portion extending around the disks for about one-quarter the circumference thereof and then merging into bearing portions 21 extending inwardly toward and close to the shaft 2. Another bearing member 22 extends from each face of the disk or web 18 and is parallel with the inwardly extending portions 21, one end of this bearing member 22 projecting beyond the peripheries of the disks 11, this projecting portion forming a tongue 23, while the other end of the member 22 terminates under the shaft 2 and at points diametrically opposite the tongue 23. Portions of the member 22 are concentric with the disks 11 but these portions do not project beyond said disks but are interposed between them. The rollers 16 project laterally from levers 15 and the bearing members of the cams are located in the paths thereof. Each arm 9 has a spring 24 secured to it and bearing against the needle mounted on said arm, so as to hold the needle normally with its point projected across the advancing face of the bucket 10.

A hopper 25 is arranged above the rear end of the concave 6 and has an outlet 26 which may be closed by a gate 27, a rod 28 extending upwardly from the gate to facilitate the opening and closing thereof. It is to be understood that the hopper 25 is to be filled with the seed potatoes and by opening gate 27, some of these potatoes will move downwardly by gravity into the concave 6 and will be seated within the two channels 7. As the machine moves forward the disks 11 will be rotated while the cam 17 remains stationary. The buckets 10 connected to each disk will be successively moved longitudinally of one of the channels 7, thus gathering potatoes thereinto, it being understood that during the downward movement of each bucket 10, the roller 16 grouped therewith, is traveling along the arcuate portion of the member 22, thus holding the needle 13 retracted from the bucket. As soon as the bucket passes from under the shaft 2, the roller 16 moves off of the member 22 and the spring 24, which has been held under stress shifts the needle 13 longitudinally and causes it to stab a potato and thus hold it in fixed relation to the bucket in which it is seated. As the bucket continues to swing in a circle, it will convey the potato therewith, the roller 16 coming into contact with the arcuate portion 20 of the member 19 until the bucket assumes a position above the shaft 2, whereupon said roller moves against the tongue 23 and is gradually pressed inward thereby toward the shaft 2, this movement of the roller resulting in the gradual retraction of the needle from the potato until, when the bucket assumes a position over the shoe 4, the potato is entirely freed and can thus drop by gravity into the shoe and into the furrow into which the shoe opens.

It is to be understood that as the buckets are brought successively into the concave the needles adjacent thereto are successively released and that said needles are also successively retracted as the buckets are brought to discharging position. It will be apparent that by rotating the series of arms at different speeds, the distances between the hills planted can be regulated.

Although springs 24 have been shown and described for the purpose of shifting the needles into engagement with the potatoes, it is to be understood that that portion 21 of the member 19 in the path of roller 16 will be sufficient to shift the roller and the needle without the necessity of employing the spring. It has been found, however, that a quicker action is usually obtained by the use of the spring. It will be apparent that the buckets 10 serve to properly center the potatoes in the paths of the stabbing needles so that, when said needles are projected, they will positively enter the potatoes seated in the buckets.

While a concave 6 has been referred to as a means for holding potatoes in the paths of the buckets 10, it is to be understood that any other suitable form of receptacle may be employed and the term "concave" is designed to include any form of receptacle suitable for the purposes intended.

What is claimed is:—

1. In a planter, a concave, a shaft mounted for rotation thereabove, a cam fixed relative to the concave and including an endless bearing strip having opposed arcuate portions concentric with the shaft and of different lengths, the shortest concentric portion being located close to the shaft, a second bearing member concentric with the shaft and located adjacent the shortest concentric portion of the first mentioned strip, said bearing member having an upwardly extending deflecting tongue, arms revoluble with the shaft, levers revoluble with the shaft and adjacent the respective arms, anti-friction devices carried by the outer ends of the levers and movable along the outer face of the endless bearing strip, a stabbing needle connected to and movable with each lever and a bucket at the outer end of each arm, said endless bearing strips constituting means for positively projecting the needles successively beyond the free ends of the arms and said arcuate bearing member coöperating with the anti-friction devices for retracting the needle positively.

2. A planter including a concave, a series of radially disposed needles revoluble above the concave, a fixed cam including an endless bearing member and a second bearing member coöperating therewith, levers revoluble with and connected to the respective needles, elements upon the levers and bearing upon the outer face of the endless member, said elements and bearing members coöperating, during the rotation of the series of needles, to move the levers and successively and quickly project the needles toward the bottom of the concave but out of contact therewith, to maintain each needle a uniform distance from the cam during a portion of the rotation of the needles, and to positively and successively retract the needles during the remainder of the rotation thereof.

In testimony that I claim the foregoing as my own, I have hereto affixed my signature in the presence of two witnesses.

JAMES THOMPSON.

Witnesses:
 HENRY CANDLIN,
 EDNA N. JONES.

Copies of this patent may be obtained for five cents each, by addressing the "Commissioner of Patents, Washington, D. C."